March 24, 1953 S. G. EVANS 2,632,617
SKIRT STRAIGHTENER
Filed Feb. 7, 1951 2 SHEETS—SHEET 1

INVENTOR
SYDNEY G. EVANS
BY Fetherstonhaugh & Co.
ATTORNEYS.

March 24, 1953     S. G. EVANS     2,632,617
SKIRT STRAIGHTENER

Filed Feb. 7, 1951                                   2 SHEETS—SHEET 2

INVENTOR
SYDNEY G. EVANS
BY Fetherstonhaugh+Co.
ATTORNEYS

Patented Mar. 24, 1953

2,632,617

UNITED STATES PATENT OFFICE 2,632,617

SKIRT STRAIGHTENER

Sydney George Evans, Sydney, New South Wales, Australia

Application February 7, 1951, Serial No. 209,869
In Australia February 8, 1950

1 Claim. (Cl. 248—124)

This invention relates to skirt straighteners, that is devices for use in marking out and cutting the edge of skirts at the correct length to give an even line thereto.

Hitherto such skirt straighteners have consisted of a stand device formed of a graduated blade or ruler upstanding from a base bracket or the like. The device has been positioned on a floor and moved around a skirt fitted on say a dressmaker's stand, and the edge of the skirt marked at a series of points, and then taken off and cut.

Now the present invention has been devised to provide a device of comparatively simple form whereby skirts can be quickly and easily cut to the required size or length in an accurate manner without the use of apparatus as set out in the preceding paragraph, and thereby obviating the manual time wasting procedure hitherto necessary for such a purpose. The present apparatus provides a wide range of adjustment, and lends itself to ready production.

According to this invention, the skirt straightener consists of a base member embodying a stem or rod upon which an arm member, preferably in two or more parts pivotally or hingedly connected together is rotatably mounted and is also slidable up or down said stem to obtain required adjustments, and there is provision for securing the said arm member at a height setting so that said member can be freely moved. In some forms a counterbalance may be provided on one side of the arm mounting to adjust for the extension out and weight of the arm member. The outer and free end of the arm member carries a cutting implement of any suitable form which in some cases may consist of a pair of scissors mounted on a pivot in a freely operable manner on said arm member and extending in a horizontal plane, while in other cases a power cutting device may be associated with said arm member.

The above described arrangement is such that the arm member being adjusted to the desired height from the floor or other surface so as to bring the cutting implement into position at the required level, the arm member is rotated about its stem and the cutting implement operated to cut and trim the edge of the skirt suspended from either on a person or a dressmaker's stand which in some forms may be supported on or from the said stem.

In order to describe the invention more fully, reference will be made to the drawings accompanying and forming part of this complete specification, wherein:

Figure 2 is a plan of same, while

Figure 1:
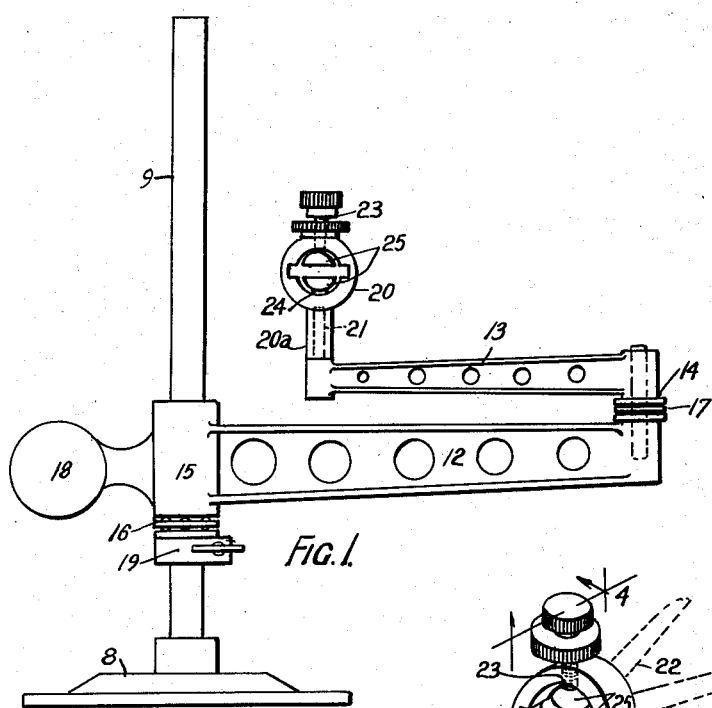
Figure 1 is a side elevation of one form of the invention.
Figure 3:
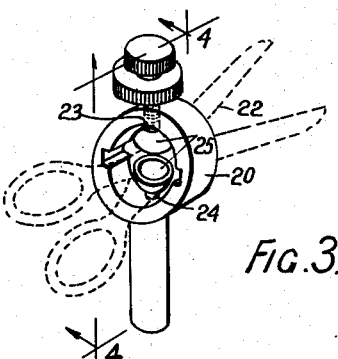
Figure 3 is a perspective view of a swivelling holder for scissors or shears used in the invention.
Figure 2:
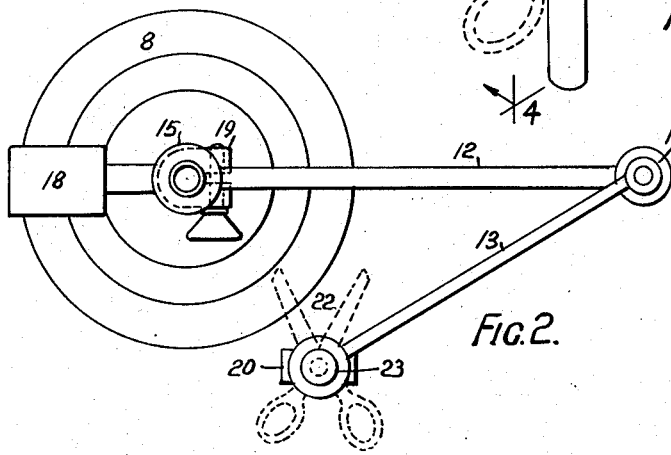
Figure 4:
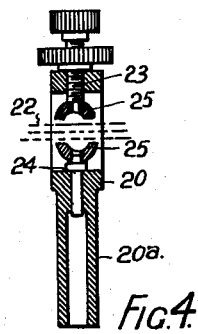
Figure 4 is a section on line 4—4 of Figure 3.
Figure 5:
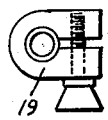
Figure 5 is a plan of a split clip for the swivelling holder.
Figure 6:
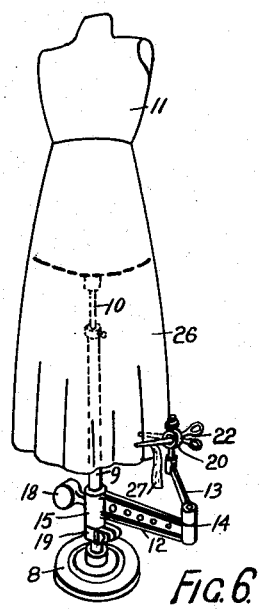
Figure 6 is a perspective view of the invention applied for use for straightening a skirt when draped upon a dressmaker's model.

The skirt straightener consists of a base 8 having a tubular stem 9 upstanding therefrom and in which the stem 10 of a dressmaker's model 11 may be fitted in a readily detachable manner as shown in Figure 6.

An arm member in two parts 12 and 13, hinged together at 14 is rotatably mounted upon the stem by a boss 15, and ball thrust bearings 16 and 17 are provided to give free and easy movement of the arm member 12—13 when in use.

A counterbalance 18 is fitted at the opposite side of the boss 15 to balance the weight of the arm member 12—13 and other parts associated therewith.

This said arm member 12—13 is adjustable along the stem 9 and may be locked at any height by a split and screw fitted clamp 19 and a swivelling scissors holder 20 with a hollow stem 20A is adapted to swivel freely upon an axle 21 held by the outer end of the arm part 13.

Scissors 22 forming the cutting implement are held in the scissors holder 20 between a clamping screw 23 and a pin 24 both of which have hollow cup shaped end fittings 25 which swivel freely on the respective ends of the said clamping screw 23 and pin 24 to provide free and easy movement of the blades of the scissors 22 when in use.

Figure 7:
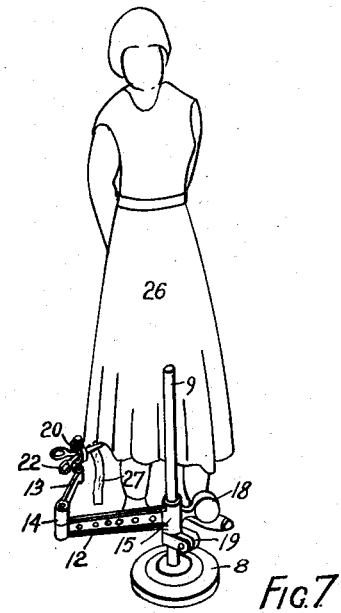
Figure 7 is a perspective view of the invention as used for straightening a skirt when draped upon a person.

Referring to Figure 6 the skirt straightener is shown in operation upon a skirt 26 draped upon the dressmaker's model 11 and the surplus material 27 of the skirt 26 is being removed, while in Figure 7 the skirt 26 is shown draped upon a person and the surplus material 27 is being removed by the straightener, which may be moved around the skirt as the work progresses.

In some constructions of the invention (not shown), a series of different forms of sizes of cutting implements may be interchangeable and adapted to be individually fitted to the arm member.

In some forms, any suitable means for marking out may be substituted for the cutting implement.

Although skirts have been hereinbefore referred to as the subjects to which this invention is applicable, such term is not intended to limit the use thereof as said invention may be equally well applied to the marking or the cutting of other articles of clothing, and also equally well applied to other purposes for which it may be suited.

I claim:

A skirt straightener consisting of a base, a substantially vertical rod rigidly secured to said base, an arm member mounted on said rod, said arm member being formed in two parts, namely an inner part and an outer part, one end of said inner part terminating in a tubular boss which is concentrically mounted upon said rod so as to rotatably mount said part with respect to said rod, the other end of said inner part rotatably mounting said outer part of said arm member so that the latter may be swung in a plane substantially parallel to that through which the inner part may be swung due to its rotatable mounting, a collar mounted on said rod below said boss and releasably clampable to said rod to hold said arm member at a vertically adjusted setting on said rod without interfering with the freedom of rotation of said inner part, means for pivotally mounting a cutting or marking tool at the outer end of said outer part, and a counterbalance for said arm member rigidly secured to said boss and extending therefrom on the side opposite said arm member.

SYDNEY GEORGE EVANS.

REFERENCES CITED

The following references are of record in the file of this patent:

UNITED STATES PATENTS

| Number | Name | Date |
| --- | --- | --- |
| 672,050 | Williamson | Apr. 16, 1901 |
| 786,646 | Johnson | Apr. 4, 1905 |
| 792,954 | Zink | June 20, 1905 |
| 980,381 | Williams | Jan. 3, 1911 |
| 1,939,833 | Schwartz | Dec. 19, 1933 |
| 2,176,252 | Favata | Oct. 17, 1939 |

FOREIGN PATENTS

| Number | Country | Date |
| --- | --- | --- |
| 17,235 | Great Britain | Aug. 17, 1909 |
| 446,313 | Great Britain | Apr. 28, 1936 |